April 28, 1964     B. J. PLEISS, JR., ETAL     3,131,322
THERMOSTATIC OVERLOAD PROTECTOR
Filed March 6, 1961     2 Sheets-Sheet 1
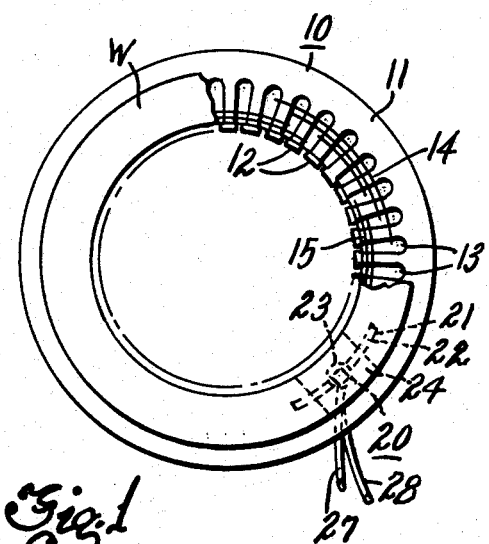
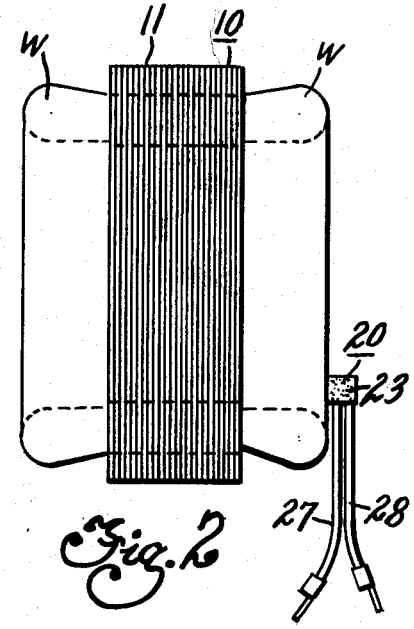
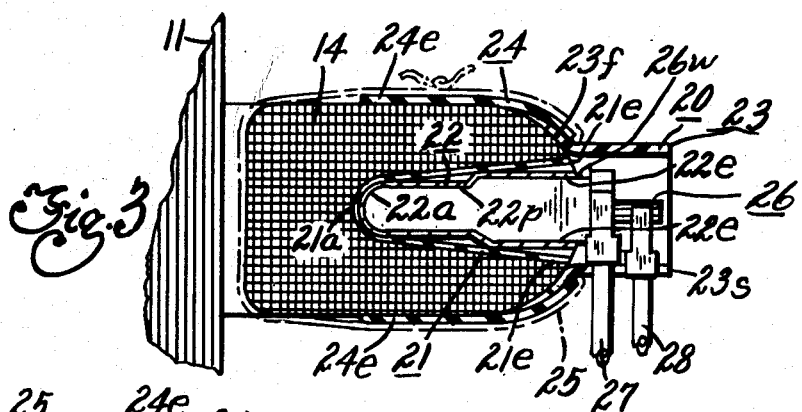
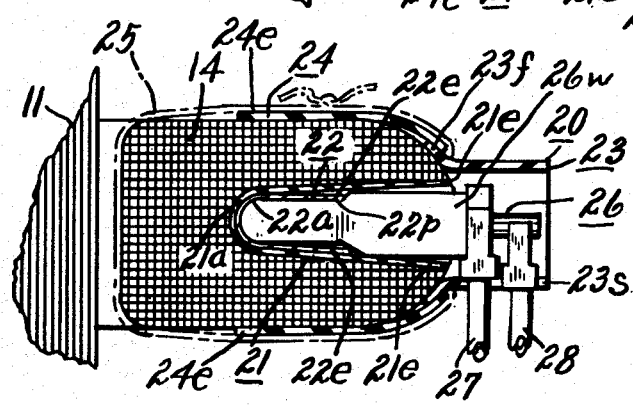
INVENTORS
BERNARD J. PLEISS JR.
THOMAS A. JACOBY
BY
THEIR ATTORNEY

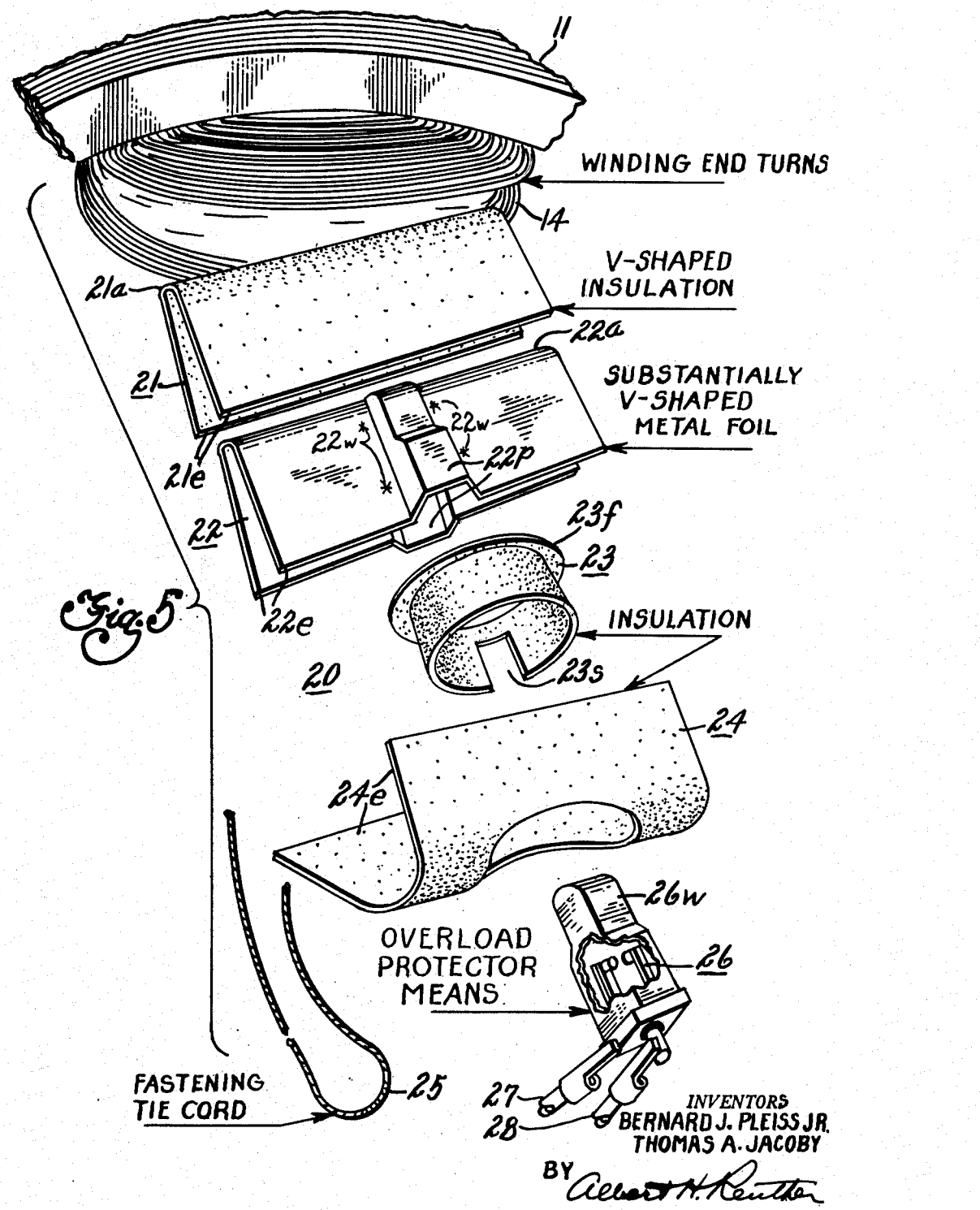

United States Patent Office 3,131,322
Patented Apr. 28, 1964

3,131,322
THERMOSTATIC OVERLOAD PROTECTOR
Bernard J. Pleiss, Jr., Dayton, Ohio, and Thomas A. Jacoby, Tecumseh, Mich.; said Pleiss assignor to General Motors Corporation, Detroit, Mich., a corporation of Delaware, and said Jacoby assignor to Tecumseh Products Company, Tecumseh, Mich.
Filed Mar. 6, 1961, Ser. No. 93,392
9 Claims. (Cl. 310—68)

This invention relates to a mounting assembly for thermostatic overload protector means and, more particularly, to a wedge-like insulator and heat conducting assembly adapted to provide a pocket for removably mounting the overload protector means.

An object of this invention is to provide a new and improved mounting assembly for an overload protector means which can be easily serviced and replaced if necessary without removal of a wedge-like insulating and foil-like heat conducting means substantially to surround a wedge-shaped casing portion of the overload protector means.

Another object of this invention is to provide a mounting assembly including a substantially V-shaped insulation portion which telescopes over a complementary substantially V-shaped metal foil-like portion that together form a substantially centrally located pocket-like recess into which a longitudinal wedge-shaped casing portion of an overload protector means can be fitted for subsequent removal and/or replacement though permitting the pair of V-shaped portions to remain in heat exchange position adjacent to any protected means such as end turns of windings of a dynamoelectric machine and the like.

Another object of this invention is to provide a semi-arcuate channel-like insulating segment covering a foil-like metal piece folded centrally to form a pocket-like recess that is located in-between end turns of windings of a dynamoelectric machine, the pocket-like recess being substantially surrounded by the metal piece that is engageable by a wedge-shaped metal casing portion of an overload protector means easily replaceable and insertable therein without requiring removal and disassembly of the channel-like insulating segment as well as the foil-like metal piece.

A further object of this invention is to provide a mounting assembly for an overload protector means having a wedge-shaped metal casing portion surrounded on opposite sides by equal amounts of both insulating material such as Mylar and heat conducting copper foil both having telescoping V-shapes and wedged into heat engaging relation between end turns of dynamoelectric machine windings.

Another object of this invention is to provide an overload protector mounting assembly including a substantially V-shaped metal foil heat sink member folded over and centrally recessed to receive a wedge-shaped metal casing portion of an overload protector means in heat exchanging relation to end turns on either side of a dynamoelectric machine and telescoped inside a V-shaped semi-arcuate segment of insulating material, the overload protector means extending substantially axially from the stator end turns and being surrounded by a radially-slotted annular insulating means fastened such as by tie cord to the end turns though the protector means including laterally extending lead wires thereto can be inserted and removed from wedging engagement inside the V-shaped segment and foil member which can be assembled to the end turns permanently and need not be removed when the overload protector is inserted and removed without costly change of insulation that remains undamaged.

Further objects and advantages will be apparent from the following description, reference being had to the drawings wherein preferred embodiments of the present invention are clearly shown.

In the drawings:
FIGURE 1 is an end view of dynamoelectric machine structure in accordance with the present invention.
FIGURE 2 is a side view of the structure of FIGURE 1.
FIGURE 3 is an enlarged cross-sectional elevational view of a portion of the structure in FIGURES 1 and 2.
FIGURE 4 is another enlarged cross-sectional elevational view similar to that of FIGURE 3.
FIGURE 5 is an exploded perspective view of structure of FIGURES 3 and 4.

Industry has a need for an inexpensive and practical protector mounting that can provide adequate insulation, good heat transfer relation as well as serviceability. Some overload protectors use probes which project inwardly and can hurt insulation and other overload protectors require permanent mountings integral therewith so as to require change of insulation and substantial work to replace an overload protector means. Low cost and accessibility are factors particularly important in view of a highly competitive situation as to supply of dynamoelectric machines including motors for some customers. Quite often dynamoelectric machines such as motors can be produced for various customers and can have features identical except for provision of overload protector means. Marginal need for overload protector means in some cases is such that a motor as originally supplied cannot be easily converted to use overload protector means except by a costly modification and rebuilding operation. However, the protector mounting in accordance with the present invention can be assembled and incorporated at low cost in substantially all dynamoelectric machines or motors produced and can be easily provided with overload protector means either after final assembly or when replacement of a protector means is required.

FIGURE 1 illustrates a stator and coil assembly having a protector mounting provided in accordance with the present invention. The assembly generally indicated by numeral 10 includes a magnetic stator core 11 provided with integral teeth 12 defining slots 13 into which a winding means including a main winding 14 and a phase winding 15 can be fitted in a well-known manner. These stator windings 14 and 15 can be energized by way of a main lead as well as a phase lead and a common connection in a well-known manner. Suitable insulation is provided for these leads and for the coil windings fitted to the stator slot 13. The stator windings 14—15 as fastened along end turns on opposite sides of the magnetic core 11 can be identified collectively by a reference W. Suitable fastening means such as tie cord can be provided though not shown in FIGURES 1 and 2. This tie cord can be laced around end turns of the main and phase windings so as to secure the end turns in a predetermined position on each of opposite sides of the stator core 11.

An overload protector mounting assembly generally indicated by numeral 20 can be seen in the views of FIGURES 1 and 2. This overload protector mounting assembly 20 preferably is fitted into a central position between end turns of the main winding 14 on a side of the stator core 11 opposite to the side where the leads for winding energization are located. As can be better seen in views of FIGURES 3, 4, and 5, this protector mounting assembly includes a substantially V-shaped insulation portion or semi-arcuate folded-over segment 21. This V-shaped portion or segment is formed of a moisture-resisting material of high dielectric strength such as cellulose derivatives and more specifically organic derivatives of cellulose. Examples of these cellulose derivatives include such organic compounds as cellulose ethers, cellulose acetate, cellulose butyrate, cellulose propionate, cellulose triacetate, benzyl cellulose, ethyl cellulose, as well as methyl cellulose. The V-shaped portion can be made entirely of such cellulose derivatives or can be formed as a strong, tough laminated insulating material including a fibrous midportion faced at least on one side with a continuous, coextensive adhering sheet of such cellulose derivative material. For greater flexibility, use of a continuous coextensive piece of cellulose acetate or similar material available commercially as Mylar is used and wedged into end turns of the winding means such as 14 on a dynamoelectric machine stator assembly. The substantially V-shaped insulating portion or segment includes a folded end or apex 21a which is permanently forced into winding means such as 14 such that a pair of laterally extending free edges 21e are located substantially in alignment with an outer periphery of the end turns of the stator windings such as 14. Any suitable mandrel or tool can be used to force the V-shaped insulation portion or segment into a semi-arcuate positioning relative to the stator windings. The semi-arcuate positioning thereof can be best visualized in the end view of FIGURE 1. Next, a complementary substantially V-shaped metal foil-like portion or thin copper piece 22 is folded centrally and laterally to have an end or apex 22a which abuts internally against the apex 21a of the insulating portion 21 which telescopes externally over the metal foil portion or piece. The metal foil portion 22 includes opposite pairs of edging 22e as well as a pocket-like central recess-forming part 22p visible in views of FIGURES 3, 4, and 5. The difference between the views of FIGURES 3 and 4 lies in the depth of the metal foil member having the central recess part thereof formed to provide a cavity or recess into which an overload protector means can be fitted. In the view of FIGURE 3 there is a greater quantity of the metal foil portion and thus greater surface areas for good heat transfer relation with respect to the end turns of a stator winding.

It is apparent from the drawings that the pocket-like recess or central part 22p is open axially at one end thereof. Located laterally and also axially in alignment with this pocket portion 22p there is a substantially cylindrical or annular insulating member 23 open at opposite ends and having a laterally outwardly extending flange 23f integral with one end thereof. Also the insulating cylindrical member 23 includes a lateral slot 23s. A centrally apertured strap 24 of insulating material fits concentrically around the lateral flange 23f of the cylindrical insulating member 23 and opposite ends 24e of this strap 24 are fitted against an outer periphery of the end turns of the stator windings which can be fastened together by suitable tie cord such as 25 shown in FIGURES 3, 4, and 5.

It is to be noted that the components including the insulating portion 21, the metal foil portion 22, as well as the insulating member 23 and centrally apertured strap 24 can be permanently assembled in continuous relation to the end turns of stator windings. Use of a foil-like portion 22 having a V-shaped configuration assures maximum surface area for heat transfer and also minimizes cost such that these components can be incorporated on all dynamoelectric machine stator assemblies as they are produced. Preferably the slot 23s of the cylindrical insulation member 23 is positioned to be located radially outwardly with respect to a central axis of the stator assembly. Thus during production assembly or even for servicing of the dynamoelectric machine a thermostatic overload protector means or bimetal switching means 26 having a wedge-shaped casing or body portion 26w can be easily inserted and removed with respect to the pocket portion or recess part 22p of the metal foil portion 22. A pair of leads 27 and 28 suitably insulated can project laterally to one side of the overload protector means 26 and these leads extend radially outwardly through the slot 23s provided in the cylindrical insulating member 23. The overload protector or bimetal switching means 26 can be inserted or removed for replacement without removal of the dual substantially V-shaped insulating portion 21 and foil-like portion 22. The pocket 22p formed by the foil-like portion either centrally thereof or offset from the center is readily accessible axially and removal of an end cover on a dynamoelectric machine housing can permit and facilitate access to the wedged-in casing portion 26w of the overload protector means. Spot welds in locations represented by references 22w in FIG. 5 showing folded foil on either side of pocket 22p can assure against separation thereof and maintenance of the pocket in a predetermined location as to the foil which can have equal or unequal lengths in opposite directions as heat sinks between winding means and the overload protector. Internal features of the overload protector means can vary according to performance characteristics required and thus a schematic representation of a bimetallic contact means therein is provided in the view of FIG. 5. The overload protector or bimetal switch means 26 can be independently inserted and removed without costly change of insulation that remains undamaged.

The cylindrical sleeve-like insulating member 23 provides lateral protection for the lead wires 27—28 and one end of the overload protector means 26. Provision of overload protection is particularly important for hermetically-sealed air-conditioning or refrigeration system motors. Due to the snug wedge-fit of the casing portion 26w peripherally inside the pocket part 22p of the metal foil and extensive engagement of continuous surface areas therebetween, it is not necessary to fasten and secure the overload protector integrally to the foil portion of metal such as copper that serves as a heat sink between the end turns of the stator windings and the overload protector means. It is to be noted that suitable protector means can be commercially obtained and that a snap-acting switching device as well as a bimetal switching means can be used in the protector mounting in accordance with the present invention.

Advantages during production and industrial usage of dynamoelectric machines having provision for overload protector mounting in accordance with the present invention include reliability and versatility. By provision of the pocket or recess in an end turn location it is possible advantageously to replace an overload protector without damage to winding insulation and/or complete replacement of an expensive stator assembly sometimes costing as much as fifty times the price of the protector which is really all that requires servicing. With cost in terms of material, labor and time for loss of operation during servicing decreased by elimination of all but overload protector servicing accomplished readily in accordance with the present invention, there is a distinct and important improvement for both manufacturers and customers alike. Yet features of the present invention assure necessary dependability and ability to react to winding and stator component temperature in a manner fully imbedded therein though substantially free of error in protector operation due to ambient air conditions alone.

While this description is directed to a single phase dynamoelectric machine, it is to be understood that embodiments of this invention can also be used for polyphase dynamoelectric machines.

While the embodiments of the present invention as herein disclosed constitute preferred forms, it is to be understood that other forms can be adopted.

What is claimed is as follows:

1. A protector mounting means, comprising, a wedge-like V-shaped insulating segment, a separate foil-like substantially V-shaped metal piece including a centrally located pocket open axially to one side thereof, and a wedge-shaped casing portion of overload protector means fitted snugly and directly in engagement with said V-shaped metal piece that effects good heat transfer to the casing portion from outside said insulating segment separate therefrom.

2. The mounting means of claim 1 wherein said segment is made of a terephthalate polyester and said V-shaped metal piece is copper foil.

3. A protector mounting means by which the protector is insertable in end turns of a dynamoelectric machine stator winding means, comprising, a substantially V-shaped insulating portion arcuately wedged into the end turns, a substantially V-shaped metal foil-like heat-sink portion separate though fitted in contiguous and complementary position inside said V-shaped insulation portion, a centrally-located pocket part integral with said foil-like portion, a thermostatic overload protector means including a generally wedge-shape casing portion press-fitted snugly and directly into the pocket part of said foil-like portion, and external means retaining said insulating and foil-like portions in the end turns.

4. The protector mounting means of claim 3 wherein a sleeve-like insulating member is fitted axially and laterally to one side of the pocket part and end turns, and a centrally-aperture generally V-shaped insulating strap and tie cord forming said external retaining means to hold said insulating and foil-like portions in the end turns.

5. The protector mounting means of claim 3 wherein a substantially cylindrical connection-shielding insulating member is provided axially adjacent to the pocket part and includes a radially outwardly located slot to permit fit of lateral lead wires to the overload protector means.

6. A mounting assembly for an overload protector means having a wedge-shaped metal casing portion, comprising, end turns of a dynamoelectric machine stator winding means, a folded-over generally V-shaped though semi-arcuate segment of insulating material fitted into said end turns, a folded-over generally V-shaped metal foil piece that is contoured into a pocket axially open to one side and telescopically fitted inside said folded-over insulating segment substantially complementary to each other, and an external insulating retaining means for permanently maintaining said insulating segment and metal piece in said end turns and protecting the axially open pocket for insertion and removal of the wedge-shape casing portion.

7. The assembly of claim 6 wherein said V-shaped segment provides equal thickness of insulation on each of opposite external sides of said folded-over foil piece.

8. The assembly of claim 6 wherein said V-shaped segment is made to include a terephthalate polyester insulating material such as Mylar and said metal piece is a high thermal conductivity material such as inexpensive though pliable copper foil and the like, both said segment and foil piece having an end apex mating with each other and having pairs of free edges substantially adjacent to an outer periphery of the end turns.

9. In an assembly of a dynamoelectric machine having a magnetic core fitted with a stator winding of which end turns project purposely recessed axially to include a substantially centrally preformed depression into which an overload protector means is to be fitted in spaced relation established exclusively by mounting means improvement comprising, a separate generally V-shaped foil-like internal metal means as well as an external generally V-shaped insulating-wedge segment telescopically fitted into contiguous relation with each other and into the end turns, said foil-like metal means having a pocket portion integral therewith into which only the overload protector means is fitted and said insulating-wedge segment provides equal thickness only externally and remote therefrom, and external fastening means to retain said insulating-wedge segment and said foil-like metal means together with the overload protector means totally within the stator winding end turns, said external fastening means including a substantially cylindrical outer connection-shielding insulating member located as to a recessed folded-over outer insulating piece tied to the end turns.

References Cited in the file of this patent
UNITED STATES PATENTS

| 1,947,078 | Cobb | Feb. 13, 1934 |
| 2,471,840 | Seely | May 31, 1949 |

FOREIGN PATENTS

| 1,181,607 | France | Jan. 12, 1959 |